United States Patent
Klein et al.

(10) Patent No.: US 6,404,420 B1
(45) Date of Patent: Jun. 11, 2002

(54) ELECTRONIC DEVICE HAVING A ROTARY SWITCH AND A DISPLAY SCREEN

(75) Inventors: Bernhard Klein, Regensburg; Axel Hengst, Lahnau, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/321,186

(22) Filed: May 27, 1999

(30) Foreign Application Priority Data

May 29, 1998 (DE) .......................................... 198 24 100

(51) Int. Cl.[7] ................................................. G09G 5/00
(52) U.S. Cl. ........................ 345/184; 345/649; 345/659
(58) Field of Search ................................. 345/184, 352, 345/353, 659, 156, 649

(56) References Cited

U.S. PATENT DOCUMENTS

| | | |
|---|---|---|
| 3,761,649 A | 9/1973 | Jedynak et al. |
| 4,963,889 A | 10/1990 | Hatch |
| 4,972,431 A | 11/1990 | Keegan |
| 5,012,056 A | 4/1991 | Abel et al. |
| 5,040,240 A | 8/1991 | Keegan |
| 5,402,117 A | 3/1995 | Zijderhand |
| 5,488,611 A | 1/1996 | Zijderhand et al. |
| 5,516,295 A | 5/1996 | Stove |
| 5,592,665 A | 1/1997 | Lahaije |
| 5,627,531 A * | 5/1997 | Posso et al. ................... 341/22 |
| 5,652,911 A | 7/1997 | VanVenrooy et al. |
| 5,771,459 A | 6/1998 | Demery et al. |
| 5,798,760 A * | 8/1998 | Vayda et al. ................. 345/352 |
| 5,870,035 A * | 2/1999 | Bjernulf ....................... 341/35 |
| 6,034,688 A * | 3/2000 | Greenwood et al. ........ 345/353 |

\* cited by examiner

Primary Examiner—Richard Hjerpe
Assistant Examiner—Kimnhung Nguyen
(74) Attorney, Agent, or Firm—David M. Thimmig; Mayer, Brown, Rowe & Maw

(57) ABSTRACT

The invention relates to an electronic device having a rotary switch and a display screen for displaying information. It is the object of the invention further to develop such a device to the effect that it permits operation which is as universal as possible and simple. The invention is defined by the fact that the rotary switch is provided for the two-dimensional movement of at least one display element of the display screen, that a rotary movement of the rotary switch is provided for selecting the direction of movement of the display element, and that a first axial movement of the rotary switch is provided for moving the display element in the selected direction of movement.

10 Claims, 3 Drawing Sheets

ELECTRONIC DEVICE HAVING A ROTARY SWITCH AND A DISPLAY SCREEN

BACKGROUND OF THE INVENTION

The invention relates to an electronic device having a rotary switch and a display screen for displaying information.

Such an electronic device is known from EP 366 132 B1. The rotary switch of this electronic device has latched positions to which there are assigned function groups (menus) or individual functions which can be selected one after another by means of rotating the rotary switch, and can be activated by means of depressing the rotary switch. Depending on the direction of rotation in the clockwise sense or in the counterclockwise sense, the individual menus or functions can be selected serially by means of rotating the rotary switch. In particular, if the individual menus or functions are arranged in two dimensions, it is difficult in the case of this known rotary switch to reach a specific menu or a specific function which is, for example, arranged at a distance in an oblique direction from the starting position.

SUMMARY OF THE INVENTION

It is the object of the invention further to develop an electronic device of the type mentioned at the beginning to the effect that it permits operation which is as universal as possible and simple.

According to the invention, this object is achieved by virtue of the fact that the rotary switch is provided for the two-dimensional movement of at least one display element of the display screen, that a rotary movement of the rotary switch is provided for selecting the direction of movement of the display element, and that a first axial movement of the rotary switch is provided for moving the display element in the selected direction of movement.

An arbitrary element represented on the display screen is denoted as display element. The term display element covers, for example, a cursor, picture graphics and symbols as well as text elements.

The direction of movement of the display element can be selected continuously or in fixed angle steps by means of rotating the rotary switch. After selection of the direction of movement, the respective display element is then displaced in the selected direction of movement by actuating the rotary switch in the axial direction.

This electronic device has the advantage that the respective display element can be moved in two-dimensional fashion in an arbitrarily selectable direction on the display screen. In particular, the display element can also be moved away from the starting position in an oblique direction.

In addition to displacing individual display elements, it is also possible to displace the entire display of the display screen in the selected direction of movement. This is advantageous, for example, in representing a map of a navigation system, in order to give the user a simple and quick possibility of looking at neighboring or adjoining map areas.

The advantageous refinement of this invention in accordance with claim 2 has the advantage that the user can detect the selected direction of movement on the screen. The display of the direction of movement on the screen can be adapted individually to the respective application and the requirements of the user by means of software which drives the screen.

The refinement of the electronic device in accordance with claim 3 has the advantage that the direction menu can be adapted to the respectively displayed information, and thus provides the user for choice only with the directions which are sensible for the respectively displayed information. For example, the direction menu can be displayed only in a sub-area of the display screen, preferably in a corner of the display screen. It is possible, furthermore, for the direction menu to enclose the display screen in the shape of a border. The selectable direction fields of the direction menu can be provided for permanent display. It is also possible to display only the respectively selected direction field of the direction menu. As a result, the surface area of the display screen which is available for the information which is actually to be displayed is larger than in the case of the continuous display of the entire direction menu.

In accordance with the advantageous refinement of claim 4, a rotatable direction arrow is provided for graphic display of the direction of movement. The rotation of the direction arrow is performed in accordance with the rotation of the rotary switch. In this case, the rotation of the direction arrow can be performed both in fixed steps and continuously. Such a rotatable direction arrow can be realized very easily in graphic terms. In addition, it requires only a small space on the display screen. The rotatable direction arrow can be arranged at different points on the display screen in accordance with the respective application. The respective display element is moved in the direction indicated by the rotatable direction arrow by an axial movement of the rotary switch.

A further possibility consists in providing a direction arrow indicating the respective direction of movement on the rotary switch itself. This is a particularly simple possibility, which does not require a graphic display on the display screen. However, it is necessary for the user to look at the respective position of the direction arrow on the rotary switch in order to inform himself of the selected direction of movement of the display element. Consequently, with this embodiment the user must avert his gaze from the display screen.

In the advantageous refinement of the electronic device in accordance with claim 5, the display element may be constructed, for example, in the form of a blinking cursor. The display element, constructed in the form of a blinking cursor, then marks the respectively selected selection field. Each selection field is assigned a function group and/or a function. A function group is understood to be a menu which provides at least two functions and/or further sub-function groups for selection. Initially, the desired direction of movement of the cursor is set by means of rotating the rotary switch, and subsequently the cursor is moved into position on the desired selection field by means of the first axial movement of the rotary switch in the selected direction of movement. The activation of a function group selected in such a way and/or of a function selected in such a way is advantageously performed by means of a second axial movement of the rotary switch which differs from the first axial movement.

In accordance with claim 7, it is preferred for the first axial movement to be implemented by depressing the rotary switch, and for the second axial movement to be realized by pulling the rotary switch. These opposing first and second axial movements render it possible for the user to carry out the desired function intuitively in a way which is functionally reliable and not susceptible to faults.

However, it is also possible to provide as the first axial movement a short depression of the rotary switch which does not last longer than a prescribable threshold period. In the case of such a refinement, the display element or the cursor is then displaced with each short depression in the selected direction of movement, and in each case the subsequent selection field is selected and marked optically by means of the display element. It is then possible, for example, to provide as second axial movement for activating a function group and/or function assigned to the respective selection field a long depression of the rotary switch which lasts longer than a prescribed threshold period. Alternatively, it is possible to provide a continuous depression of the rotary switch as first axial movement, a corresponding movement of the display element taking place in the selected direction of movement as long as the rotary switch is depressed. The speed of the movement of the display element can be increased in this case within a fixed time reference. The activation of the selected selection field can then be performed in the case of this embodiment by means of a short depression of the rotary switch or by means of pulling the rotary switch, for example.

In accordance with claim 8, it is also alternatively possible to provide an activation field in the direction menu. Such an activation field can then be selected by means of rotating the rotary switch and be activated by means of an axial movement of the rotary switch. In this embodiment, there is no need for a second axial movement differing from the first axial movement. Both the movement of the display element in the selected direction of movement and the activation of a selected selection field can be implemented by means of one and the same axial movement, that is to say by means of depressing the rotary switch, for example.

BRIEF DESCRIPTION OF THE DRAWINGS

Some diagrammatically represented exemplary embodiments of the invention are explained in more detail below with the aid of the drawing in FIGS. 1 to 5, in which.

DETAILED DESCRIPTION OF THE PREFERRED EMBODIMENTS

Figure 1:
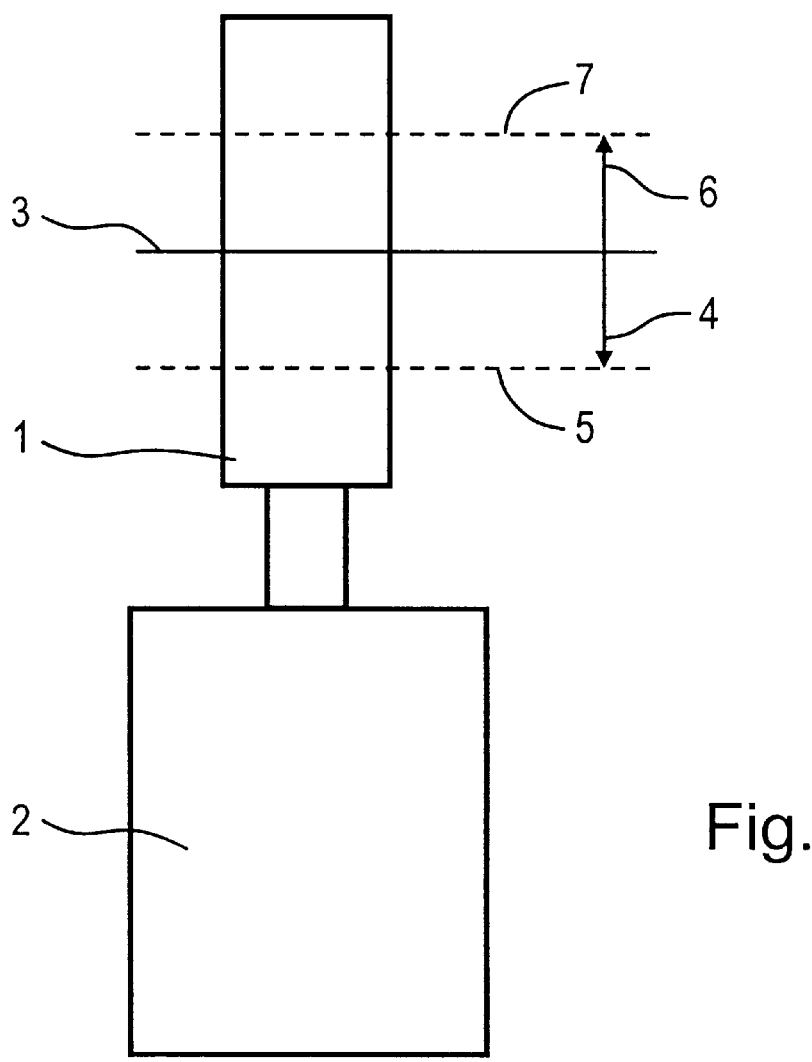
FIG. 1 shows the principle of the design of a rotary switch, in side view.

FIG. 1 shows a rotary switch 1 of a diagrammatically represented electronic device 2, in side view. The rotary switch 1 is located in a middle position 3. Starting from this middle position 3, the rotary switch 1 can be depressed in the direction of the arrow 4 into a depressed position 5. In the opposite direction, the knob 1 can be pulled, starting from the middle position 3 in the direction of an arrow 6 into a pulled position 7. The knob 1 is biased in the direction of the middle position 3 by means of springs (not represented), with the result that if it is released by the operator it springs back automatically into the middle position 3 both from the depressed position 5 and from the pulled position 7.

Figure 2:
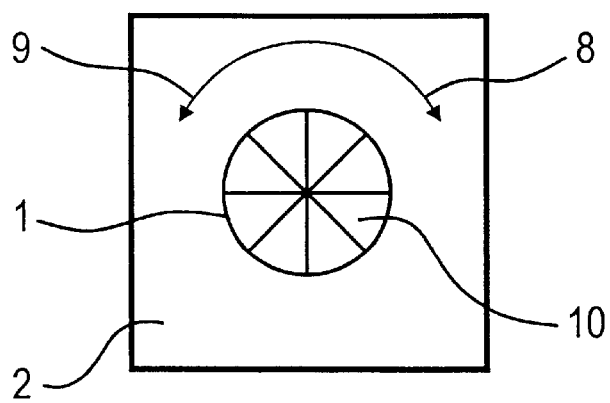
FIG. 2 shows the principle of the design of the rotary switch in accordance with FIG. 1, in plan view.

FIG. 2 shows the rotary switch in accordance with FIG. 1 in plan view. The operator can rotate the rotary switch 1 clockwise in the direction of the arrow 8 and counterclockwise in the direction of the arrow 9. The rotary mechanism of the rotary switch 1 is implemented by means of an incremental transmitter without a stop. The incremental transmitter subdivides a full revolution of the rotary switch 1 into a prescribable number of steps 10.

Figure 3:
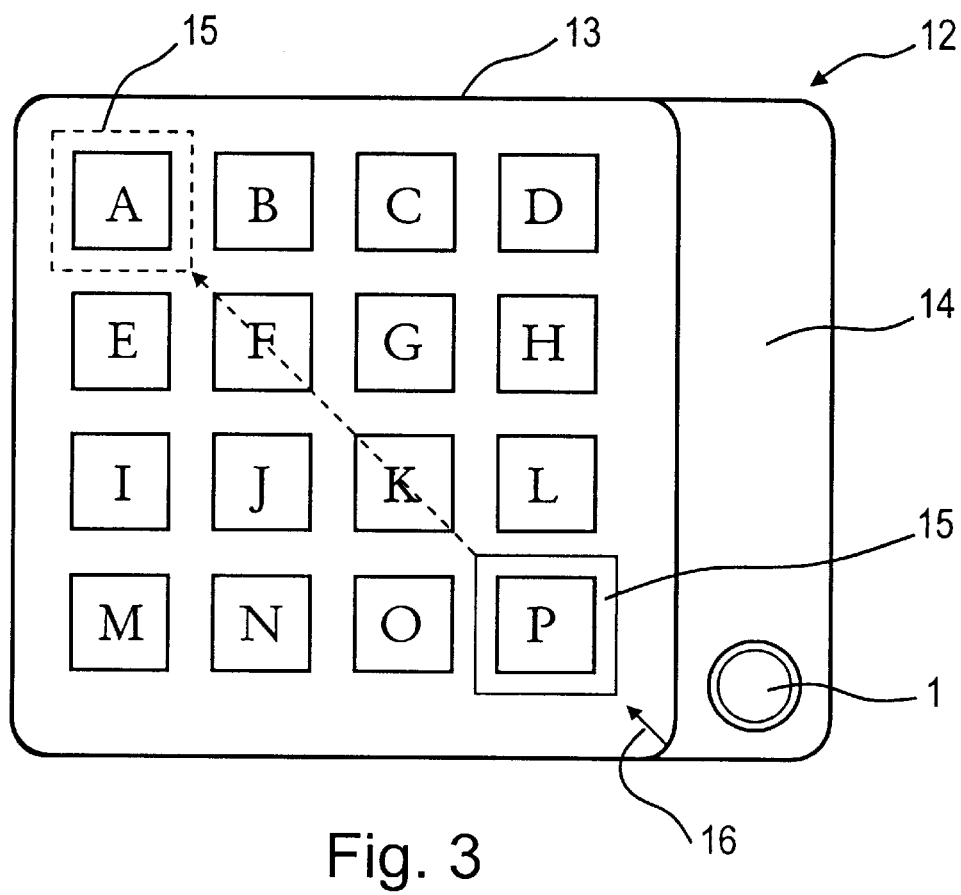
FIG. 3 shows a display screen of an electronic device, it being possible to select the direction of movement of a cursor by means of a rotary movement of the rotary switch, and the selected direction of movement being displayed graphically as a direction arrow.

FIG. 3 shows a display screen 12 having a display area 13 and an operating area 14. The rotary switch 1 is arranged in the operating area 14. The display area 13 of the display screen 12 has sixteen selection fields A to P. These display fields A to P are assigned individual function groups (menus) and/or functions. Provided as display element is a cursor 15 by means of which one of the selection fields A to P can be selected. The cursor 15 encloses the selected selection field P in the form of a frame, thus marking the selected selection field P optically. The optical marking of the selected selection field P can be reinforced by blinking of the cursor 15, for example.

The direction of movement of the cursor 15 can be selected by means of rotating the rotary switch 1. Provided for the purpose of optical display of the selected direction of movement is a rotary direction arrow 16 which is arranged in the bottom right-hand corner of the display area 13 of the display screen 12.

The selection of the direction of movement of the cursor 15, and the subsequent movement of the cursor 15 in the selected direction of movement are to be explained below with the aid of an example. In FIG. 3, the cursor 15 frames the selection field P and thus marks in an optical fashion that this selection field P has been selected. In order to displace or move the cursor 15, it is firstly necessary to select the desired direction of movement of the cursor 15. This is performed by means of rotating the rotary switch 1. The direction of movement selected by means of the rotary movement of the rotary switch 1 is represented graphically by means of the direction arrow 16. In FIG. 3, a direction of movement which extends upwards to the left at an angle of approximately 45° has been selected for the cursor 15. In order to move the cursor 15 in the selected direction of movement, a first axial movement of the rotary switch 1 is provided. The first axial movement can, for example, be a short depression of the rotary switch 1 which does not last longer than a prescribable threshold period. Starting from the position of the cursor 15 represented in FIG. 3, said cursor is moved into position on the selection field K by means of a single short depression of the rotary switch 1, is moved into position on the selection field F by means of a further short depression of the rotary switch 1, and moved into position on the selection field A by means of a further depression. A short triple depression thus moves the cursor 15 from the selection field P onto the selection field A into the position represented by dashes.

Provided for activating the respectively selected selection field, in this example for activating the selection field A, is a second axial movement of the rotary switch 1 which differs from the first axial movement. It is possible, for example, to provide as second axial movement a long depression of the rotary switch 1 which lasts longer than the prescribable threshold period. It is thereby possible for such a long depression to activate the selection field A, as a result of which the function group assigned to the selection field A and/or the function assigned to the selection field A are called up or activated.

As an alternative possibility, depressing the rotary switch 1 can be provided as first axial movement, and pulling the rotary switch 1 can be provided as second axial movement. It is also possible to provide continuous depression of the rotary switch 1 as first axial movement, the speed of movement of the cursor 15 being controlled in this case by a time-out, that is to say if the user keeps the rotary switch depressed for a specific time (for example 750 ms), the speed of the movement of the cursor 15 is doubled. Further increases in the speed of movement of the cursor 15 can take place at a later point in time, that is to say in the case of a longer-lasting depression of the rotary switch 1.

FIGS. 4a to 4d show an embodiment of the invention in which not only individual display elements, but the entire display area 13 can be displaced in a selected direction of movement. In the selected exemplary embodiment, the display area 13 of the display screen 12 serves to display a map section 17 of a map of a navigation system. In order to select the direction of movement of the map section 17, a direction menu 18 is provided which encloses the display area 13 of the display screen 12 in the shape of a border. The border-shaped direction menu 18 has direction fields 19 which are respectively distributed in alternation with activation fields 20 over the circumference of the display area 13. The direction fields 19 mark the respectively selected direction of movement for the map section 17. The activation fields 20 can be used to leave the application "display map section" and to call up a selection menu for further functions.

The various direction fields 19 of the direction menu 18 and the activation fields 20 can respectively be selected one after another by means of rotating the rotary switch 1. This mode of operation will now be explained in more detail below with the aid of FIGS. 4a to 4d.

Figure 4A:
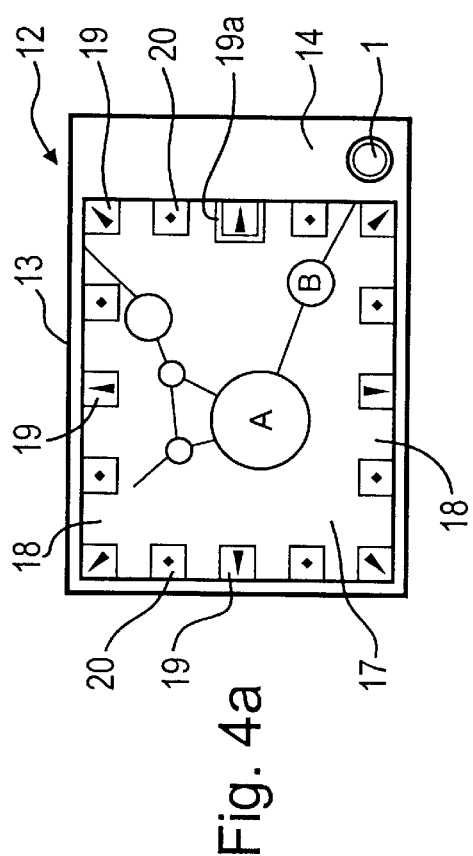
FIGS. 4a–4d show a sequence of different displays of a display screen, the display area of the display screen being provided for the purpose of representing a map and it being possible for the map to be displaced in a selectable direction of movement, and a direction menu enclosing the display screen in the shape of a border being provided for selecting the direction of movement.
Figure 4B:
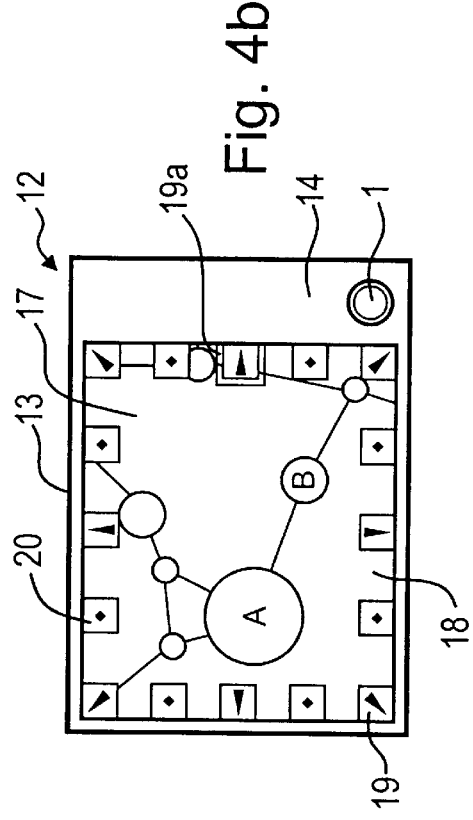
Figure 4C:
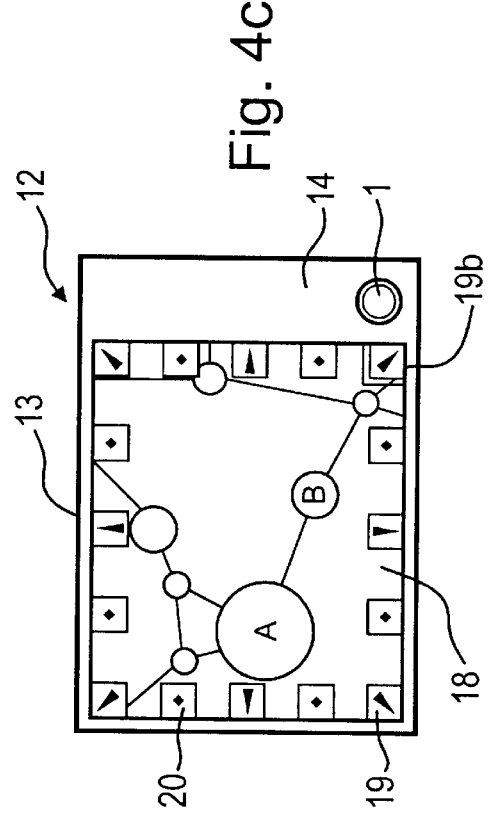
Figure 4D:
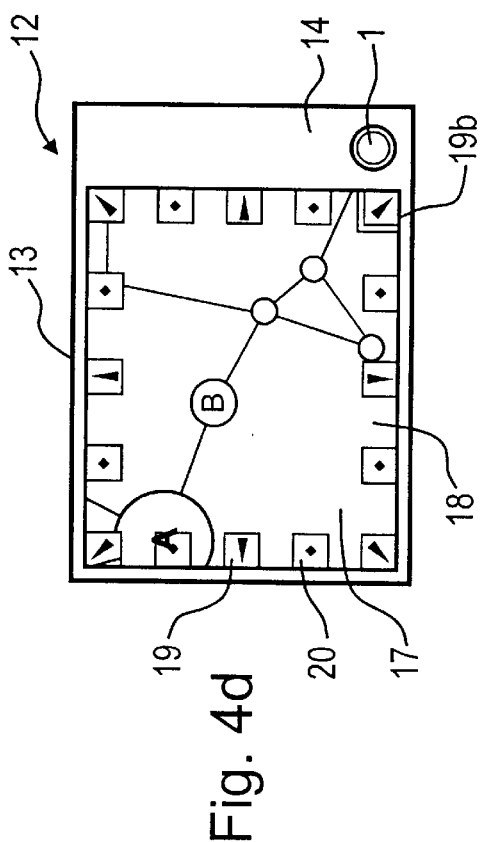

The optically emphasized direction field 19a "arrow right" has been selected in FIG. 4a by rotating the rotary switch 1. The map section 17 represented on the display area 13 can be displaced to the right by means of depressing the rotary switch 1. As long as the rotary switch 1 is depressed in the case of the selected direction field 19a, the map section 17 moves to the right. This is represented in FIG. 4b, in which the map section 17 has been displaced to the right by comparison with the map section 17 represented in FIG. 4a. The display field 19b "arrow bottom right" has been selected in FIG. 4c by rotating the rotary switch 1. With the direction field 19b selected, the map section 17 is moved to "bottom right" by means of depressing the rotary switch 1 as long as the rotary switch 1 is depressed. This is represented in FIG. 4d. With the direction field 19b selected, the map section 17 represented in FIG. 4d is displaced to "bottom right" by comparison with the map section 17 represented in FIGS. 4b and 4c by means of depressing the rotary switch 1.

The speed of movement of the map section 17 can be increased by a time-out, that is to say if the user keeps the rotary switch 1 depressed for a prescribable minimum period, for example 750 ms, the speed of movement of the map section 17 is doubled. Further increases in the speed of movement of the map section 17 can occur in the case of longer-lasting depression of the rotary switch 1. Such a time-out function can be controlled and set by software. In order to leave the function "display map section", one of the activation fields 20 must be selected by means of rotating the rotary switch 1. By subsequently depressing the rotary switch 1 when an activation field 20 has been selected, the function "display map section" is then left and, for example, a main menu or similar is called up for the purpose of selecting different functions.

In the case of the direction menu 18, software can be used to ensure that it is always only the currently selected direction field 19 which is displayed, while the remaining direction fields 19 remain hidden. As a result, the surface area available for the map section 17 actually to be displayed is enlarged. Owing to the alternating arrangement of direction fields 19 and activation fields 20, the user is able to leave the function "display map section" after each rotary step of the rotary switch 1 and, for example, call up a main menu.

Figure 5:
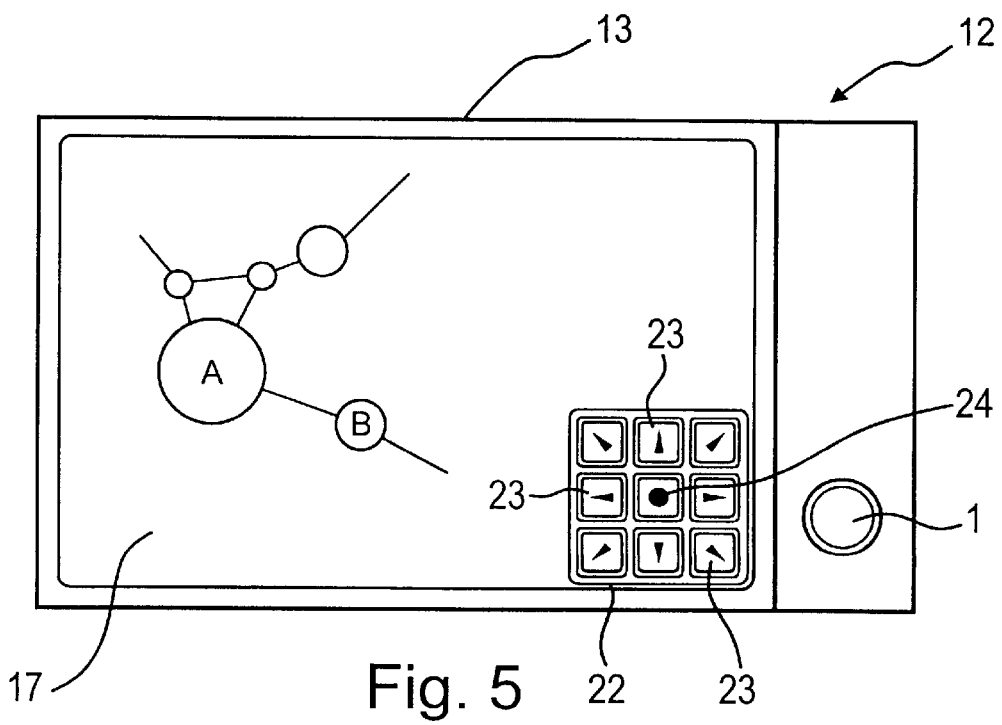
FIG. 5 shows a display screen in accordance with FIG. 4a, the direction menu being arranged in the lower right-hand corner of the screen.

FIG. 5 shows the display screen 12 in accordance with FIG. 4, on which a map section 17 of a map of a navigation system is likewise represented. A direction menu 22 is arranged in the lower right-hand corner of the display area 13 for the purpose of selecting the direction of movement of the map section 17. The direction menu 22 has discrete direction fields 23, marking the respective direction of movement, and a central activation field 24. The various direction fields 23 and the activation field 24 can be selected by means of rotating the rotary switch 13. One of the direction fields 23 can be selected by means of rotating the rotary switch 1 in order to displace the map section 17 in a desired direction of movement. The map section 17 is then displaced in the selected direction of movement by subsequently depressing the rotary switch 1. This is performed in accordance with the statements made in relation to FIGS. 4a to 4d. The direction menu 22 can be realized by software, for example in such a way that the activation field 24 is respectively selected after each individual direction field 23 upon rotation of the rotary switch 1. Alternatively, it is possible for the activation field 24 to be respectively selected only after a complete revolution of the rotary switch 1. If the rotary switch 1 is depressed with an activation field 20 selected, the function "display map section" is left in accordance with the statements made in relation to FIGS. 4a to 4d, and a main menu or similar is called up.

The invention demonstrates a possibility of using a rotary switch to move a cursor, other display elements of a screen, or the entire display area of the screen in directions which can be prescribed arbitrarily. Particularly suitable as fields of application for the invention are electronic devices in motor vehicles such as, for example, navigation systems, since a rotary switch can be operated relatively easily and in a functionally reliable fashion even during the journey. In addition, such a rotary switch can be implemented cost-effectively and in a space-saving fashion.

What is claimed is:

1. An electronic device having a rotary switch and a display screen for displaying information, wherein the rotary switch is provided for the two-dimensional movement of at least one display element of the display screen, in that a rotary movement of the rotary switch is provided for selecting the direction of movement of the display element, and in that a first axial movement of the rotary switch is provided for moving the display element in the selected direction of movement.

2. The electronic device as claimed in claim 1, wherein a graphic display of the direction of movement is provided on the display screen for the purpose of selecting the direction of movement.

3. The electronic device as claimed in claim 2, wherein a direction menu having direction fields marking the respective direction of movement is provided as graphic display for the purpose of selecting the direction of movement.

4. The electronic device as claimed in claim 1, wherein a rotatable direction arrow is provided for graphic display of the direction of movement.

5. The electronic device as claimed in claim 1, wherein individual function groups and/or selection fields assigned to functions can be selected by means of the movement of the display element, the display element being provided for the optical marking of the respectively selected selection field.

6. The electronic device as claimed in claim 5, wherein a second axial movement is provided for the purpose of activating a function group and/or a function.

7. The electronic device as claimed in claim 6, wherein the first axial n movement is a depressing movement of the rotary switch, and the second axial movement is a pulling movement of the rotary switch.

8. The electronic device as claimed in claim 7, wherein the direction menu has at least one activation field which can be selected by means of the rotary movement of the rotary switch and can be activated by means of an axial movement of the rotary switch, the activation field being provided for activating a selected function group and/or function.

9. The electronic device as claimed in claim 1, wherein the rotary switch is provided for the two-dimensional movement of the entire display area of the display screen, in particular for the purpose of moving a map section represented on the display screen.

10. A navigation system having an electronic device as claimed in claim 1.

* * * * *